(12) United States Patent
Ishikawa

(10) Patent No.: US 12,140,227 B2
(45) Date of Patent: Nov. 12, 2024

(54) TENSIONER

(71) Applicant: TSUBAKIMOTO CHAIN CO., Osaka (JP)

(72) Inventor: Yuichiro Ishikawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/378,340

(22) Filed: Oct. 10, 2023

(65) Prior Publication Data

US 2024/0191782 A1   Jun. 13, 2024

(30) Foreign Application Priority Data

Dec. 8, 2022  (JP) .................. 2022-196579

(51) Int. Cl.
F16H 7/08 (2006.01)

(52) U.S. Cl.
CPC ....... F16H 7/08 (2013.01); *F16H 2007/0806* (2013.01); *F16H 2007/0812* (2013.01); *F16H 2007/0891* (2013.01)

(58) Field of Classification Search
CPC ..... F16H 2007/0812; F16H 2007/0814; F16H 2007/0817
USPC .......................................... 474/110
See application file for complete search history.

(56) References Cited

U.S. PATENT DOCUMENTS

| | | | | |
|---|---|---|---|---|
| 5,117,786 A | * | 6/1992 | Trzmiel | F16H 7/0848 123/90.31 |
| 5,577,970 A | * | 11/1996 | Smith | F16H 7/0848 474/135 |
| 5,700,213 A | * | 12/1997 | Simpson | F16H 7/0848 474/111 |
| 5,707,309 A | * | 1/1998 | Simpson | F16H 7/08 474/135 |
| 5,720,684 A | * | 2/1998 | Mott | F16H 7/0848 474/111 |
| 5,842,943 A | * | 12/1998 | Tada | F16H 7/08 474/111 |
| 5,860,881 A | * | 1/1999 | Tada | F16H 7/08 474/111 |
| 5,879,256 A | * | 3/1999 | Tada | F16H 7/0848 474/111 |
| 5,935,031 A | * | 8/1999 | Tada | F15B 21/044 474/138 |
| 5,967,921 A | * | 10/1999 | Simpson | F16H 7/0848 474/111 |

(Continued)

FOREIGN PATENT DOCUMENTS

JP   2019-113178 A   7/2019

*Primary Examiner* — Henry Y Liu
(74) *Attorney, Agent, or Firm* — WHDA, LLP (57) ABSTRACT

Provided is a tensioner which has a small total number of components and no risk of incorrect assembly, allows easy load change, is easy to assemble, and excellently stabilizes an oil pressure in a pressure oil chamber. The tensioner 100 includes a relief mechanism that relieves oil to the outside of a plunger 110 when the oil pressure in the pressure oil chamber formed between the plunger 110 and a plunger containing hole 121 in a housing 120 increases, relief holes 141 extending through the plunger 120 from the inside of a plunger inner space 111 to an outer circumferential side thereof, and a hole closing member 142 that is pressed into an opening of each of the relief holes 141 on the outer circumferential side.

7 Claims, 8 Drawing Sheets

(56) References Cited

U.S. PATENT DOCUMENTS

| | | | | |
|---|---|---|---|---|
| 5,993,342 A * | 11/1999 | Wigsten | ................... | F16H 7/08 |
| | | | | 474/111 |
| 6,193,623 B1 * | 2/2001 | Koch | ................... | F16H 7/0836 |
| | | | | 474/138 |
| 6,322,468 B1 * | 11/2001 | Wing | ................... | F16H 7/0848 |
| | | | | 474/135 |
| 6,352,487 B1 * | 3/2002 | Tada | ................... | F01L 1/02 |
| | | | | 474/110 |
| 6,361,458 B1 * | 3/2002 | Smith | ................... | F16H 7/0848 |
| | | | | 474/110 |
| 6,383,103 B1 * | 5/2002 | Fujimoto | ................ | F16H 7/08 |
| | | | | 474/110 |
| 6,398,682 B1 * | 6/2002 | Suzuki | ................. | F16H 7/0848 |
| | | | | 474/110 |
| 6,435,993 B1 * | 8/2002 | Tada | ................... | F16H 7/0836 |
| | | | | 474/110 |
| 7,775,924 B2 * | 8/2010 | Koch | ................... | F16H 7/0848 |
| | | | | 251/339 |
| 8,221,274 B2 * | 7/2012 | Sato | ................... | F16H 7/0836 |
| | | | | 474/138 |
| 10,753,433 B2 * | 8/2020 | Watanabe | ................ | F16H 7/14 |
| 10,871,208 B2 * | 12/2020 | Yoshida | ................ | F16H 7/0848 |
| 11,143,100 B2 * | 10/2021 | Iwasaki | ................ | F16H 7/0829 |
| 11,143,274 B2 * | 10/2021 | Sato | ................... | F16H 7/08 |
| 11,268,598 B2 * | 3/2022 | Watanabe | ............ | F16H 7/0848 |
| 11,448,292 B2 * | 9/2022 | Ishikawa | ................ | F16H 7/08 |
| 2002/0022541 A1 * | 2/2002 | Ullein | ................. | F16H 7/0836 |
| | | | | 474/101 |
| 2002/0052259 A1 * | 5/2002 | Nakakubo | ............ | F16H 7/0848 |
| | | | | 474/110 |
| 2002/0065159 A1 * | 5/2002 | Markley | ................ | F16H 7/0848 |
| | | | | 474/110 |
| 2004/0067806 A1 * | 4/2004 | Markley | ................ | F16H 7/0848 |
| | | | | 474/111 |
| 2006/0003859 A1 * | 1/2006 | Sato | ................... | F16H 7/0836 |
| | | | | 474/110 |
| 2006/0094549 A1 * | 5/2006 | Yoshida | ................ | F16H 7/0836 |
| | | | | 474/110 |
| 2006/0293133 A1 * | 12/2006 | Simpson | ................ | F16H 7/0848 |
| | | | | 474/110 |
| 2007/0270259 A1 * | 11/2007 | Koch | ................... | F16H 7/0848 |
| | | | | 474/110 |
| 2008/0015069 A1 * | 1/2008 | Kroon | ................... | F16H 7/0836 |
| | | | | 474/110 |
| 2008/0280712 A1 * | 11/2008 | Ryouno | ................ | F16H 7/0848 |
| | | | | 474/110 |
| 2010/0004080 A1 * | 1/2010 | He | ................... | F16K 17/0406 |
| | | | | 137/535 |
| 2010/0062886 A1 * | 3/2010 | Yamamoto | ............ | F16H 7/0836 |
| | | | | 474/110 |
| 2010/0093474 A1 * | 4/2010 | Onimaru | ................ | F16H 7/0848 |
| | | | | 474/110 |
| 2011/0237370 A1 * | 9/2011 | Hartmann | ............ | F16H 7/0836 |
| | | | | 474/110 |
| 2011/0263366 A1 * | 10/2011 | Botez | ................... | F16H 7/0848 |
| | | | | 474/110 |
| 2018/0274636 A1 * | 9/2018 | Watanabe | ................ | F16H 7/14 |
| 2019/0063562 A1 * | 2/2019 | Watanabe | ............ | F16H 7/0831 |
| 2019/0107178 A1 * | 4/2019 | Yoshida | ................ | F16H 7/0848 |
| 2019/0195123 A1 * | 6/2019 | Iwasaki | ................ | F16H 7/0829 |
| 2019/0257389 A1 * | 8/2019 | Sato | ................... | F16H 7/08 |
| 2019/0257392 A1 * | 8/2019 | Watanabe | ............ | F16H 7/0848 |
| 2019/0277370 A1 * | 9/2019 | Iwasaki | ................ | F16H 7/08 |
| 2019/0323580 A1 * | 10/2019 | Watanabe | ............ | F16H 7/0848 |
| 2020/0011401 A1 * | 1/2020 | Kurematsu | ........... | F16H 7/0848 |
| 2020/0393023 A1 * | 12/2020 | Ishikawa | ................ | F16H 7/08 |
| 2021/0285524 A1 * | 9/2021 | Shinoyama | ............ | F02B 67/06 |

* cited by examiner

TENSIONER

BACKGROUND OF THE INVENTION

1. Field of the Invention

The present invention relates to a tensioner that applies an appropriate tension to a running chain, belt, or the like.

2. Description of the Related Art

Conventionally, it has been common practice to use a tensioner to appropriately hold a tension of a chain or the like. For example, in a chain guide mechanism that uses a tensioner lever to slide and guide a transmission chain such as a roller chain endlessly wound between respective sprockets provided on a crankshaft and a camshaft in an engine room, a tensioner used to bias the tensioner lever so as to appropriately hold a tension of the chain or the like is well known.

As a well-known tensioner used in such a chain guide mechanism, a tensioner including a plunger having a rearwardly open plunger inner space, a housing having a forwardly open plunger containing hole that contains the plunger, a main biasing member extendably and retractably contained in a pressure oil chamber formed between the plunger and the plunger containing hole to forwardly bias the plunger, and a relief mechanism that relieves oil in the pressure oil chamber to the outside of the plunger when an oil pressure in the pressure oil chamber increases has been known (see, e.g., in Japanese Patent Application Publication No. 2019-113178).

SUMMARY OF THE INVENTION

The tensioner described in Japanese Patent Application Publication No. 2019-113178 can handle, as one component, a relief valve unit to be inserted into the plunger, is easy to assemble, has a low flow path resistance, and smoothes pressure relief during leakage to be able to excellently stabilize the oil pressure in the pressure oil chamber.

However, the relief valve unit includes a plurality of components each having a fine structure, and therefore has a problem in that, in the event of incorrect assembly, it is difficult to find the incorrect assembly.

Additionally, to adjust an open valve pressure, it is necessary to change a ball spring load, which leads to a problem that increased variety deteriorates productivity.

The present invention has been achieved in view of such circumstances, and an object of the present invention is to provide a tensioner which has a small total number of components and no risk of incorrect assembly, allows easy load change, is easy to assemble, and excellently stabilizes an oil pressure in a pressure oil chamber.

The present invention solves the problem described above with a tensioner including: a plunger having a rearwardly open plunger inner space; a housing having a forwardly open plunger containing hole that contains the plunger; a main biasing means extendably and retractably contained in a pressure oil chamber formed between the plunger and the plunger containing hole to forwardly bias the plunger; and a relief mechanism that relieves oil in the pressure oil chamber to the outside of the plunger when an oil pressure in the pressure oil chamber increases, the relief mechanism including a relief hole extending through the plunger from the inside of the plunger inner space to an outer circumferential side thereof and a hole closing member pressed into an opening of the relief hole on the outer circumferential side.

According to a first aspect of the invention, the relief mechanism has the relief hole extending through the plunger from the inside of the plunger inner space to the outer circumferential side thereof and the hole closing member pressed into the opening of the relief hole on the outer circumferential side, and consequently it is unnecessary to insert a component for the relief mechanism into the plunger to facilitate assembly of the tensioner.

Additionally, since the pressing of the hole closing member into the opening of the relief hole is performed from the outer circumferential side, there is no risk of incorrect assembly, and the tensioner can be configured to include a small number of components to allow easy load change and allow a simpler structure to be obtained.

In a configuration according to a second aspect of the invention, by merely fitting an O-ring made of an elastic body or the like into the fitting recessed portion, the opening of the relief hole can be closed, and the tensioner can be configured such that, when the oil pressure in the pressure oil chamber increases to a predetermined pressure or more, the O-ring or the like is deformed against a tightening force during the fitting to allow the oil to leak from the opening and allow a simpler structure to be obtained.

In a configuration according to a third aspect of the invention, by using a C-ring as the hole closing member, it is possible to precisely set an elasticity for deformation and more excellently stabilize the oil pressure in the pressure oil chamber.

A configuration according to a fourth aspect of the invention includes a position fixing mechanism that restricts circumferential movement in the fitting recessed portion to allow the oil pressure in the pressure oil chamber to be more excellently stabilized without changing a circumferential positional relationship between the opening of the relief hole and a slot portion of the C-ring.

In a configuration according to a fifth aspect of the present invention, by providing a projecting portion on an inner circumferential side of the hole closing member, the projecting portion is engaged with the opening of the relief hole or the like to be able to restrict circumferential and axial movement.

In a configuration according to a sixth aspect of the present invention, the projecting portion is engaged with a recessed portion provided at a position different from that of the relief hole to be able to restrict the circumferential and axial movement and close the opening of the relief hole in any shape.

In a configuration according to a seventh aspect of the present invention, an oil leakage groove hole is provided inside the fitting recessed portion to extend from the opening of the relief hole to a slot portion of a C-ring, which allows a flow rate of oil leakage to be controlled before relief under a pressure not less than a predetermined pressure.

DESCRIPTION OF THE PREFERRED EMBODIMENTS

First Embodiment

As illustrated in FIGS. 1 to 4, a tensioner 100 in a first embodiment of the present invention includes a plunger 110 having a rearwardly open plunger inner space 111, a housing 120 having a forwardly open plunger containing hole 121 that contains the plunger 110, a pressing spring 130 serving as a main biasing means extendably and retractably contained in a pressure oil chamber formed between the plunger 110 and a plunger containing hole 121 to forwardly bias the plunger 110, and a relief mechanism that relieves oil in the pressure oil chamber to the outside of the plunger 110 when an oil pressure in the pressure oil chamber increases.

The plunger 110 has a groove-shaped fitting recessed portion 112 in an outer circumference thereof on a projecting side, and is provided with relief holes 141 each extending through the plunger 110 from the inside of the plunger inner space 111 to an outer circumferential side thereof to open in the fitting recessed portion 112.

In the fitting recessed portion 112, an O-ring 142 made of an elastic body serving as a hole closing member is elastically fitted.

When the tensioner 100 operates, oil is supplied into the pressure oil chamber via a check valve 122 disposed at a bottom portion of the plunger containing hole 121.

When an oil pressure in the plunger inner space 111 forming the pressure oil chamber is not more than a predetermined pressure, the O-ring 142 closes openings of the relief holes 141 to maintain the oil pressure inside the pressure oil chamber.

When the oil pressure in the plunger inner space 111 forming the pressure oil chamber exceeds the predetermined pressure, the O-ring 142 is deformed under a pressure via the relief holes 141 to relieve the openings of the relief holes 141, and the oil flows to the outside to reduce the oil pressure in the plunger inner space 111 forming the pressure oil chamber and allow the relief mechanism to operate.

In the present embodiment, the two relief holes 141 are provided at positions 180° separate from each other, but the number of the relief holes 141 and hole diameters thereof can optionally be set according to a relief pressure required of the relief mechanism.

Alternatively, the O-ring 142 may also be formed of any material, such as rubber or resin.

Second Embodiment

As illustrated in FIGS. 5 to 8, a tensioner 100b in a second embodiment of the present invention includes a plunger 110b having a rearwardly open plunger inner space 111b, a housing 120 having the forwardly open plunger containing hole 121 that contains the plunger 110b, the pressing spring 130 serving as a main biasing means extendably and retractably contained in a pressure oil chamber formed between the plunger 110b and the plunger containing hole 121 to forwardly bias the plunger 110b, and a relief mechanism that relieves oil in the pressure oil chamber to the outside of the plunger 110b mentioned above when an oil pressure in the pressure oil chamber increases.

The plunger 110b has a groove-shaped fitting recessed portion 112b in an outer circumference thereof on a projecting side, and is provided with a relief hole 141b extending through the plunger 110b from the inside of the plunger inner space 111b to an outer circumferential side thereof to open in the fitting recessed portion 112b.

In the fitting recessed portion 112b, an annular C-ring 143 serving as a hole closing member and having a slot portion 144 in a portion thereof is elastically fitted.

When the tensioner 100b operates, the oil is supplied into the pressure oil chamber via the check valve 122 disposed at the bottom portion of the plunger containing hole 121.

When an oil pressure in the plunger inner space 111b forming the pressure oil chamber is not more than a predetermined pressure, the C-ring 143 closes an opening of the relief hole 141b to maintain the oil pressure inside the pressure oil chamber.

When the oil pressure in the plunger inner space 111b forming the pressure oil chamber exceeds the predetermined pressure, the C-ring 143 is deformed under a pressure via the relief hole 141b to relieve the opening of the relief hole 141b, and the oil flows to the outside to reduce the oil pressure in the plunger inner space 111b forming the pressure oil chamber and allow the relief mechanism to operate.

In the present embodiment, the one relief hole 141b is provided, but the number of the relief holes 141b and hole diameters thereof can optionally be set according to a relief pressure required of the relief mechanism.

Alternatively, the C-ring 143 may also be formed of any material, such as metal or resin.

Third Embodiment

As illustrated in FIGS. 9 to 12, a tensioner 100c in a third embodiment of the present invention includes a plunger 110c having a rearwardly open plunger inner space 111c, the housing 120 having the forwardly open plunger containing hole 121 that contains the plunger 110c, the pressing spring 130 serving as a main biasing means extendably and retractably contained in a pressure oil chamber formed between the plunger 110c and the plunger containing hole 121 to forwardly bias the plunger 110c, and a relief mechanism that relieves oil in the pressure oil chamber to the outside of the plunger 110c mentioned above when an oil pressure in the pressure oil chamber increases.

The plunger 110c has a fitting recessed portion 112c formed, in an outer circumference thereof on a projecting side, as a smaller diameter portion from a leading end side, and is provided with a relief hole 141c extending through the plunger 110c from the inside of the plunger inner space 111c to an outer circumferential side to open in the fitting recessed portion 112c.

In the fitting recessed portion 112c, an annular C-ring 143c serving as a hole closing member and having a slot portion 144c in a portion thereof is elastically fitted.

Additionally, the C-ring 143c has a projecting portion 145c provided, on an inner circumferential side, as a position fixing mechanism that restricts circumferential and axial movement in the fitting recessed portion 112c.

When the tensioner 100c operates, the oil is supplied into the pressure oil chamber via the check valve 122 disposed at a bottom portion of the plunger containing hole 121.

When an oil pressure in the plunger inner space 111c forming the pressure oil chamber is not more than a predetermined pressure, the C-ring 143c closes an opening of the relief hole 141c to maintain the oil pressure inside the pressure oil chamber.

When the oil pressure in the plunger inner space 111c forming the pressure oil chamber exceeds the predetermined pressure, the C-ring 143c is deformed under a pressure via the relief hole 141c to relieve the opening of the relief hole 141c, and the oil flows to the outside to reduce the oil pressure in the plunger inner space 111c forming the pressure oil chamber and allow the relief mechanism to operate.

The projecting portion 145c of the C-ring 143c is engaged with the opening of the relief hole 141c to restrict circumferential movement, and consequently the slot portion 144c and the opening of the relief hole 141c are prevented from overlapping to cause a problem in the relief mechanism, while the same position of the C-ring 143c constantly faces the opening of the relief hole 141c to hold a closing force constant and stabilize an operation pressure of the relief mechanism.

Additionally, since the projecting portion 145c of the C-ring 143c is engaged with the opening of the relief hole 141c to restrict the axial movement, it is possible to form the fitting recessed portion 112c not in the form of a groove, but as the smaller diameter portion from the leading end side, which facilitates processing of the plunger 110c and also facilitates the fitting of the C-ring 143c during assembly.

In the present embodiment, the one relief hole 141c is provided, but the number of the relief holes 141c and hole diameters thereof can optionally be set according to a relief pressure required of the relief mechanism.

Alternatively, the C-ring 143c may also be formed of any material, such as metal or resin.

Fourth Embodiment

As illustrated in FIGS. 13 to 16, a tensioner 100d in a fourth embodiment of the present invention includes a plunger 110d having a rearwardly open plunger inner space 111d, the housing 120 having the forwardly open plunger containing hole 121 that contains the plunger 110d, the pressing spring 130 serving as a main biasing means extendably and retractably contained in a pressure oil chamber formed between the plunger 110d and the plunger containing hole 121 to forwardly bias the plunger 110d, and a relief mechanism that relieves oil in the pressure oil chamber to the outside of the plunger 110d mentioned above when an oil pressure in the pressure oil chamber increases.

The plunger 110d has a fitting recessed portion 112d formed, in an outer circumference thereof on a projecting side, as a smaller diameter portion from a leading end side, and is provided with a relief hole 141d extending through the plunger 110d from the inside of the plunger inner space 111d to an outer circumferential side thereof to open in the fitting recessed portion 112d.

In the fitting recessed portion 112d, an annular C-ring 143d serving as a hole closing member and having a slot portion 144d in a portion thereof is elastically fitted.

Additionally, the C-ring 143d has a projecting portion 145d provided, on an inner circumferential side, as a position fixing mechanism that restricts circumferential and axial movement in the fitting recessed portion 112d.

Additionally, the fitting recessed portion 112d has a recessed portion 113d that is provided at a position different from that of an opening of the relief hole 141d to be engageable with the projecting portion 145d.

When the tensioner 100d operates, the oil is supplied into the pressure oil chamber via the check valve 122 disposed at a bottom portion of the plunger containing hole 121.

When an oil pressure in the plunger inner space 111d forming the pressure oil chamber is not more than a predetermined pressure, the C-ring 143d closes the opening of the relief hole 141d to maintain the oil pressure inside the pressure oil chamber.

When an oil pressure in the plunger inner space 111d forming the pressure oil chamber exceeds a predetermined pressure, the C-ring 143d is deformed under a pressure via the relief hole 141d to relieve the opening of the relief hole 141d, and the oil flows to the outside to reduce the oil pressure in the plunger inner space 111d forming the pressure oil chamber and allow the relief mechanism to operate.

The projecting portion 145d of the C-ring 143d is engaged with the recessed portion 113d to restrict circumferential movement, and consequently the slot portion 144d and the opening of the relief hole 141d are prevented from overlapping to cause a problem in the relief mechanism, while the same position of the C-ring 143d constantly faces the opening of the relief hole 141d to hold a closing force constant and stabilize an operation pressure of the relief mechanism.

Additionally, the projecting portion 145d of the C-ring 143d is engaged with the recessed portion 113d to restrict axial movement, and consequently it is possible to form the fitting recessed portion 112d not in the form of a groove, but as a smaller diameter portion from the leading end side, which facilitates processing of the plunger 110d and also facilitates the fitting of the C-ring 143d during assembly.

Additionally, the projecting portion 145d and the recessed portion 113d can be provided at any positions and in any shapes, which improves design flexibility.

In the present embodiment, the one relief hole 141d is provided, but the number of the relief holes 141d and hole diameters thereof can optionally be set according to a relief pressure required of the relief mechanism.

Alternatively, the C-ring 143d may also be formed of any material, such as metal or resin.

Still alternatively, the projecting portion 145d and the recessed portion 113d may also be in a combination having a reverse projecting/recessed relationship, and the position of the C-ring 143d may also be fixed with a pin, by welding, or the like after assembly.

Yet alternatively, it may also be possible to provide, in the fitting recessed portion 112d, a projection that is engageable with the slot portion 144d and thereby restrict circumferential movement of the C-ring 143d or provide a portion of the fitting recessed portion 112d on the leading end side with a projection for retaining the C-ring 143d and thereby restrict axial movement.

Fifth Embodiment

Figure 1:
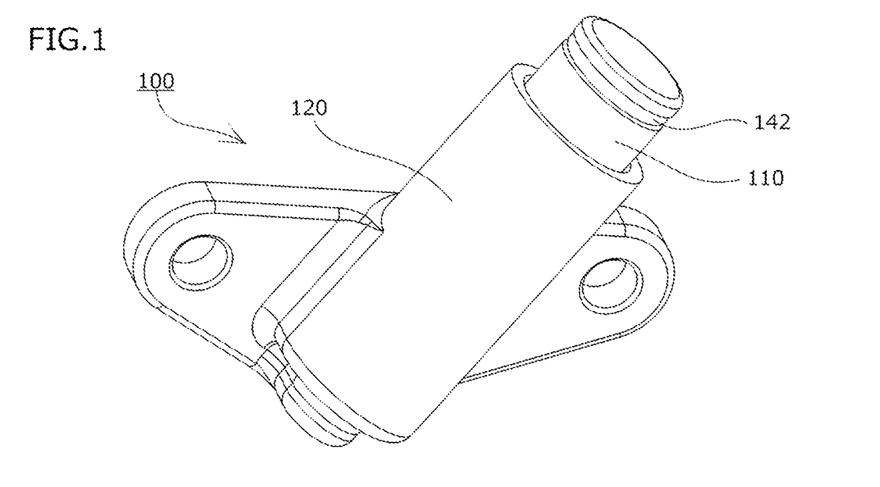
FIG. 1 is a perspective view of a tensioner according to a first embodiment of the present invention.
Figure 2:
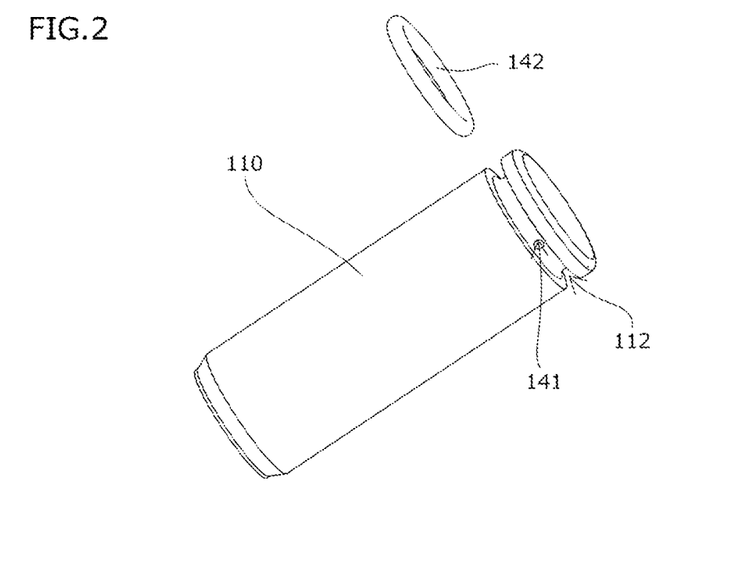
FIG. 2 is an exploded view of a plunger and a relief mechanism of the tensioner illustrated in FIG. 1.
Figure 3:
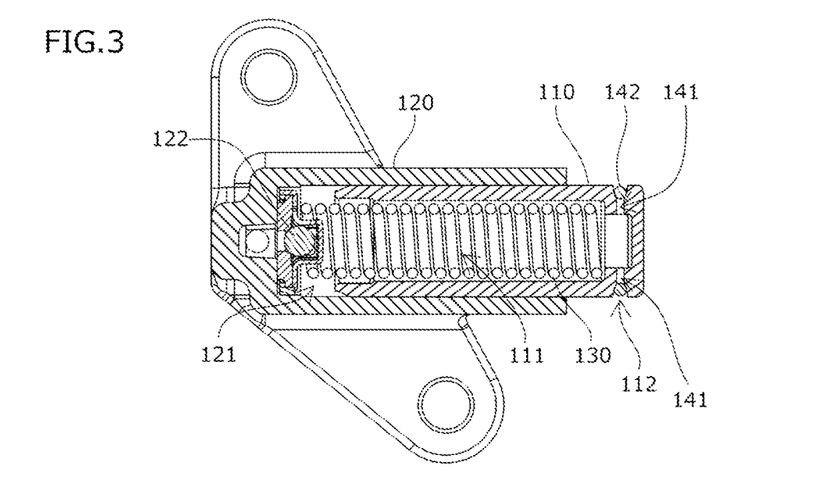
FIG. 3 is a cross-sectional view of the tensioner illustrated in FIG. 1.
Figure 4:
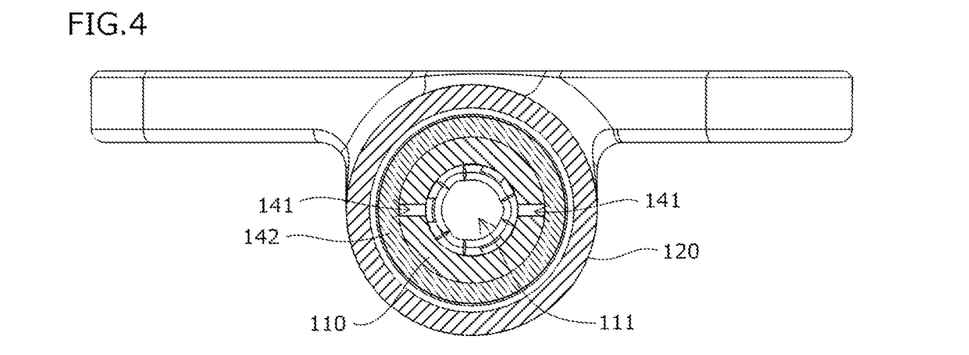
FIG. 4 is cross-sectional view taken along a plane including relief holes of the tensioner illustrated in FIG. 1.
Figure 5:
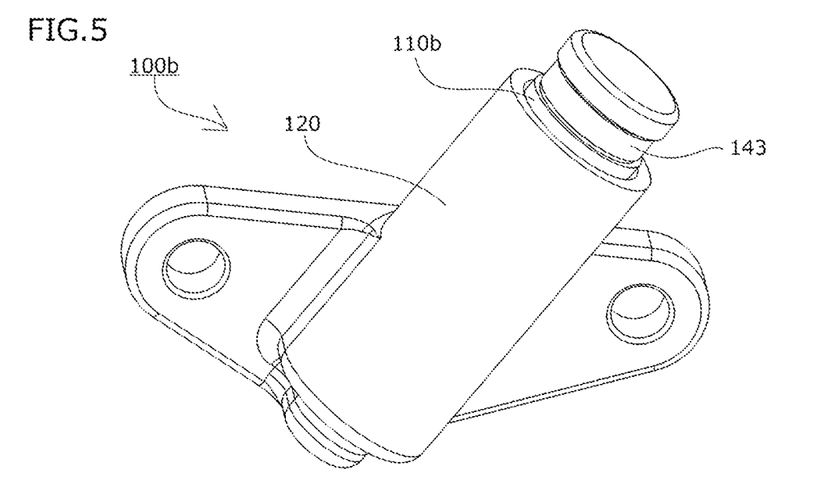
FIG. 5 is a perspective view of a tensioner according to a second embodiment of the present invention.
Figure 6:
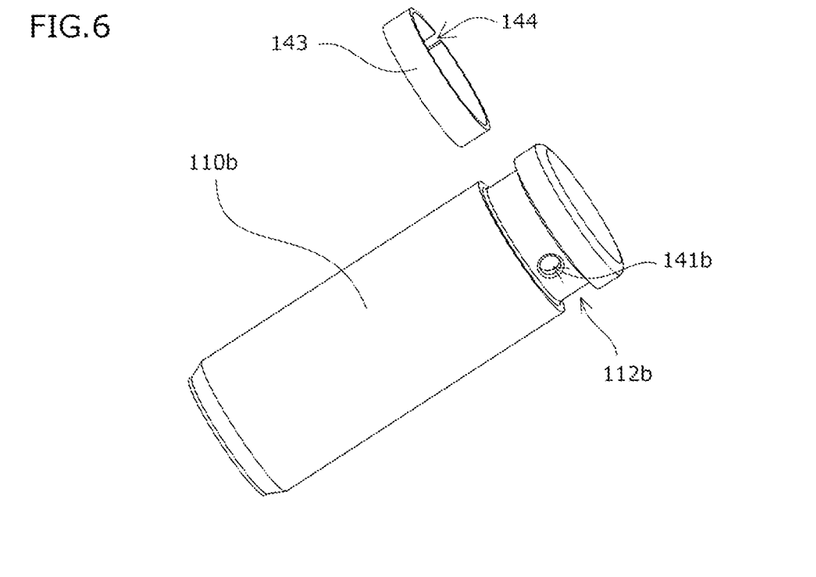
FIG. 6 is an exploded view of a plunger and a relief mechanism of the tensioner illustrated in FIG. 5.
Figure 7:
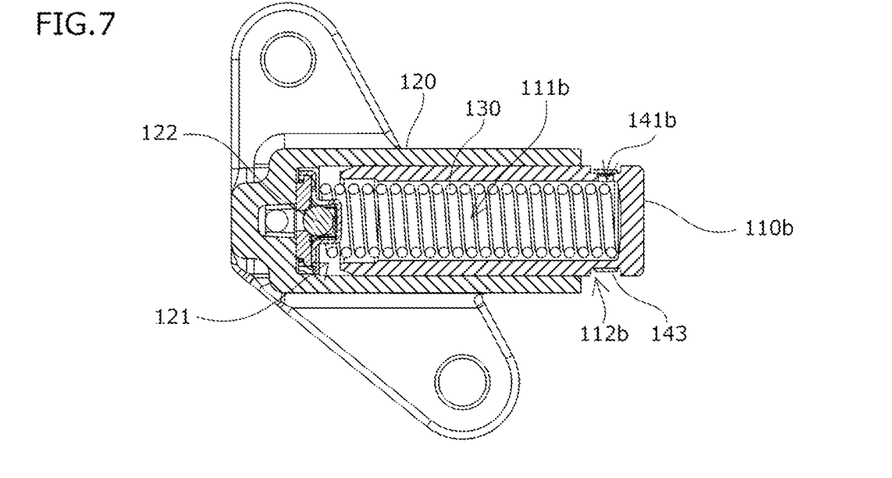
FIG. 7 is a cross-sectional view of the tensioner illustrated in FIG. 5.
Figure 8:
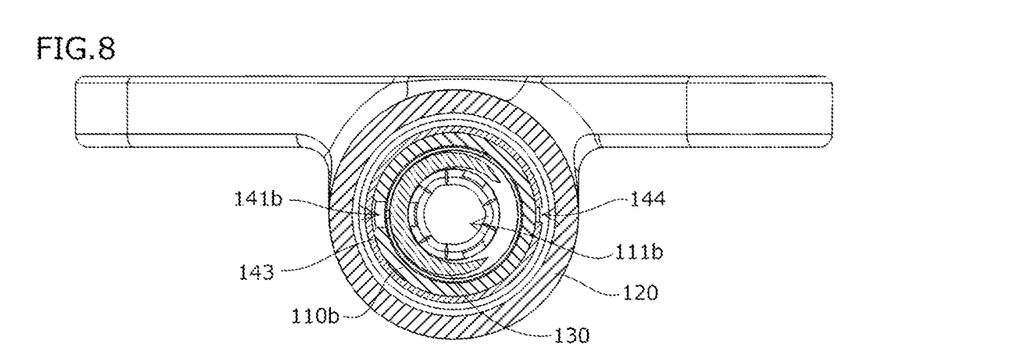
FIG. 8 is a cross-sectional view taken along a plane including relief holes of the tensioner illustrated in FIG. 5.
Figure 9:
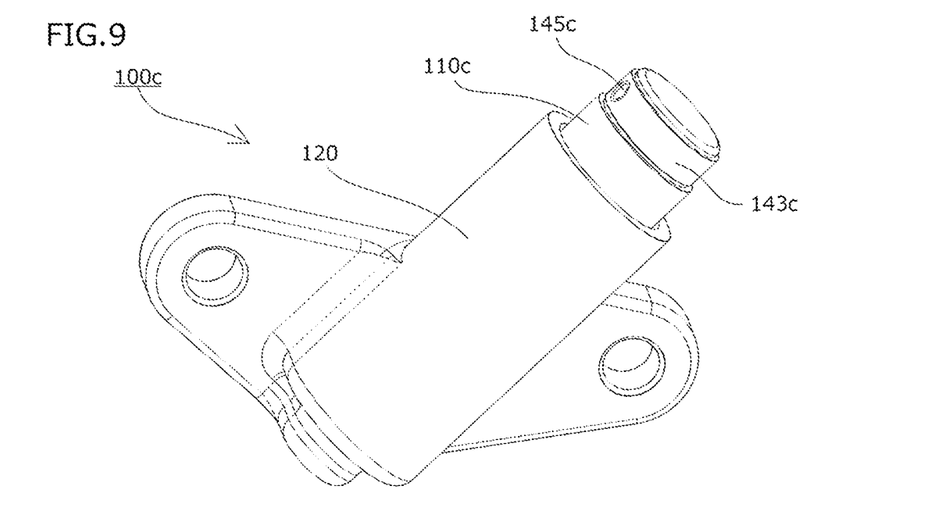
FIG. 9 is a perspective view of a tensioner according to a third embodiment of the present invention.
Figure 10:
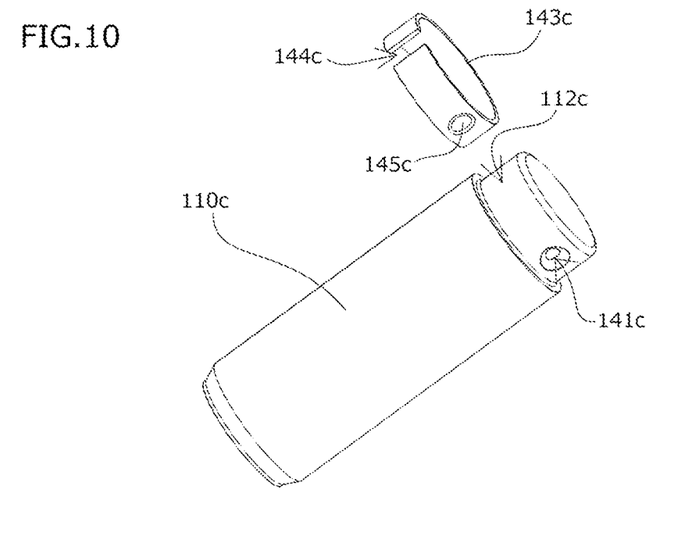
FIG. 10 is an exploded view of a plunger and a relief mechanism of the tensioner illustrated in FIG. 9.
Figure 11:
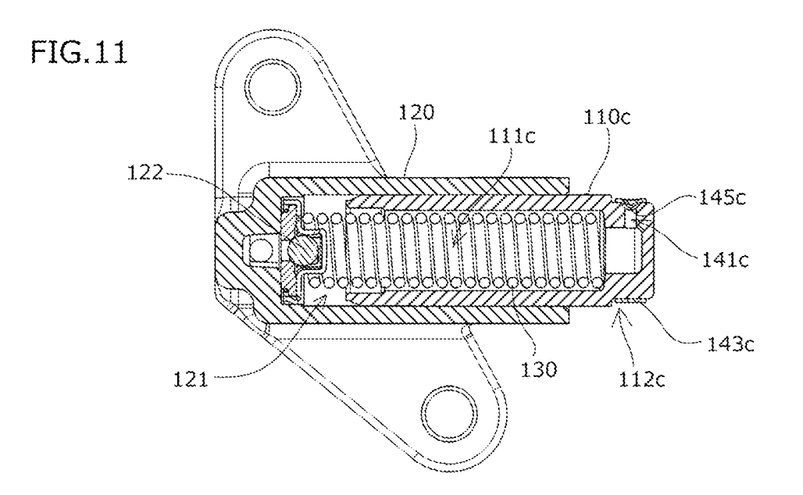
FIG. 11 is a cross-sectional view of the tensioner illustrated in FIG. 9.
Figure 12:
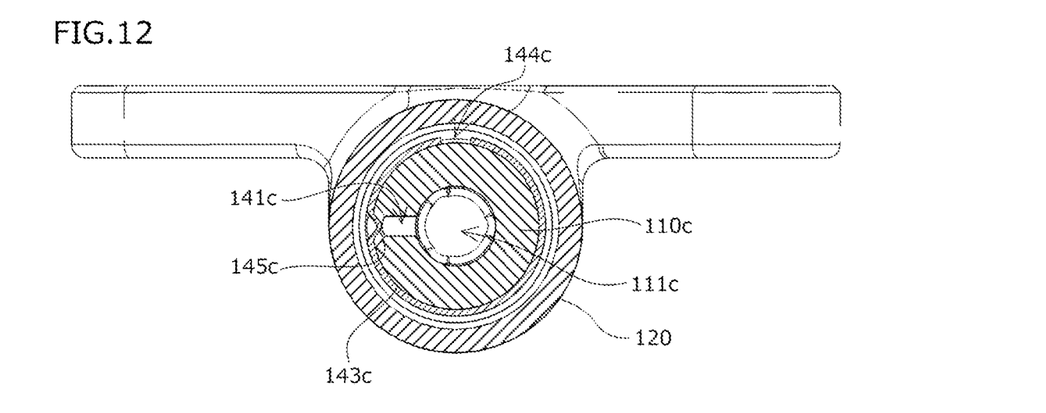
FIG. 12 is a cross-sectional view taken long a plane including relief holes of the tensioner illustrated in FIG. 9.
Figure 13:
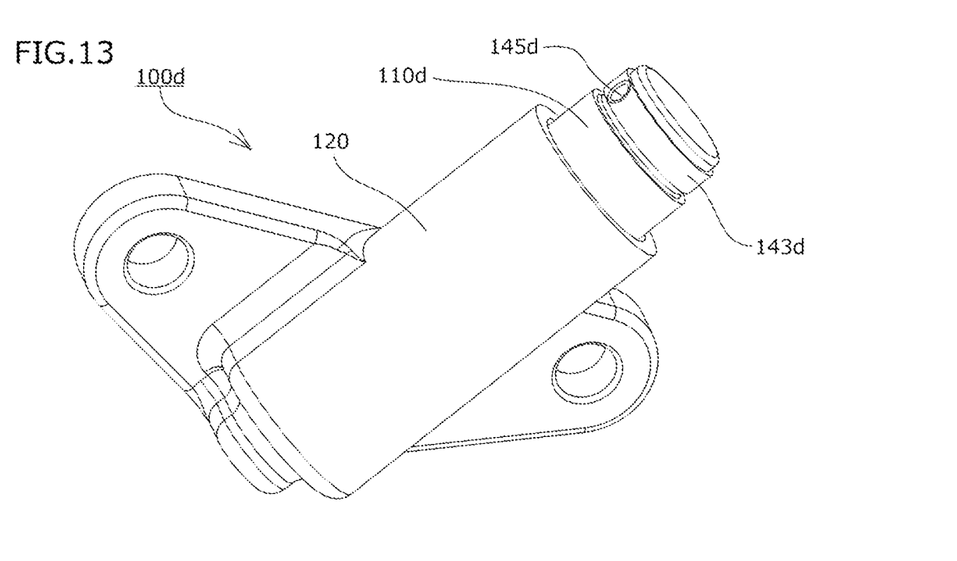
FIG. 13 is a perspective view of a tensioner according to a fourth embodiment of the present invention.
Figure 14:
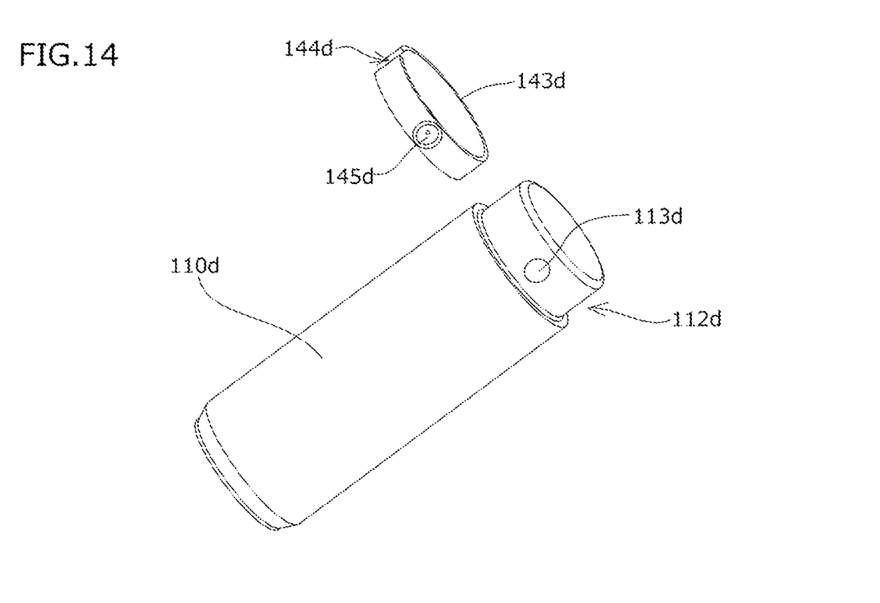
FIG. 14 is an exploded view of a plunger and a relief mechanism of the tensioner illustrated in FIG. 13.
Figure 15:
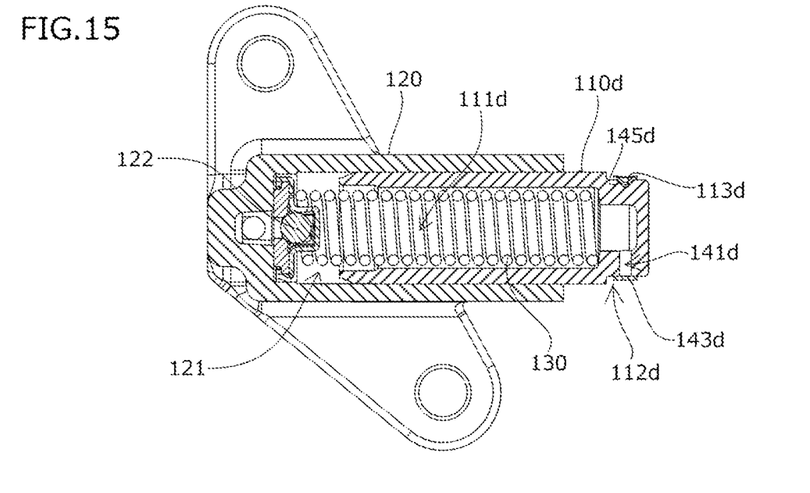
FIG. 15 is a cross-sectional view of the tensioner illustrated in FIG. 13.
Figure 16:
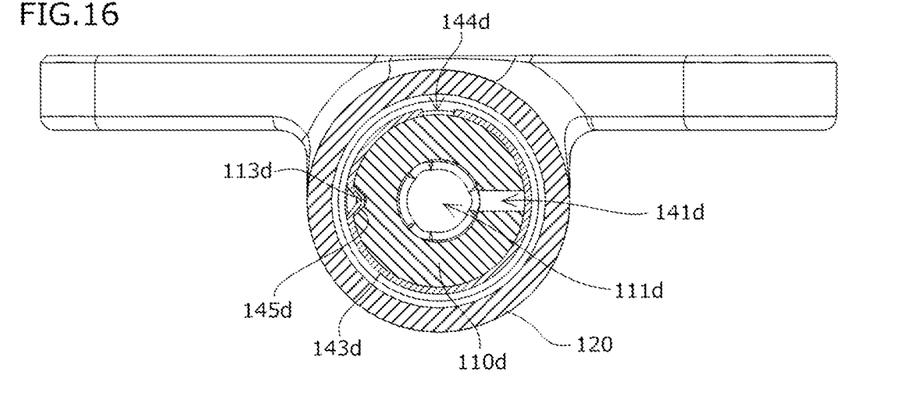
FIG. 16 is a cross-sectional view taken along a plane including relief holes of the tensioner illustrated in FIG. 13.
Figure 17:
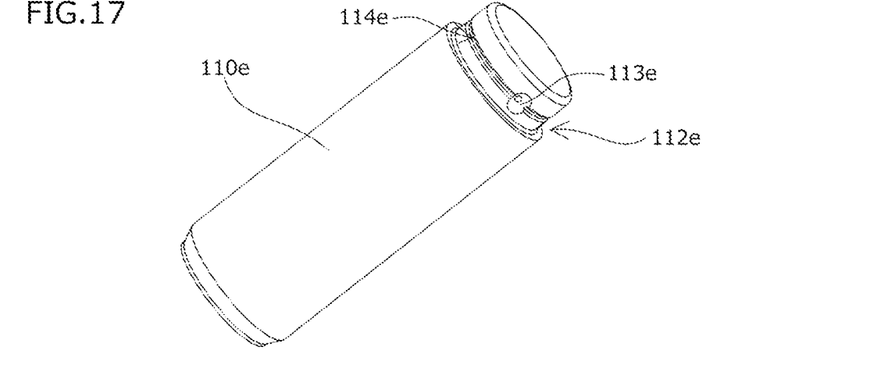
FIG. 17 is a plunger perspective view according to a fifth embodiment of the present embodiment.

A tensioner according to a fifth embodiment of the present invention is the same as that in the fourth embodiment except for a plunger 110e illustrated in FIG. 17.

The plunger 110e has a fitting recessed portion 112e formed, in an outer circumference on a projecting side, as a smaller diameter portion from a leading end side, and a relief hole 141e is provided to extend through the plunger 110e from the inside of a plunger inner space 111e to an outer circumferential side to open in a fitting recessed portion 112e, while an oil leakage groove 114e is provided at a position in a circumferential direction traversing an opening of the relief hole 141e.

Consequently, even in a state where the C-ring closes the opening of the relief hole, an oil flow path is formed to extend through the oil leakage groove 114e to a slot portion to open to the outside.

This oil flow path operates as a so-called orifice-type relief mechanism to be able to provide a hybrid-type relief mechanism which normally operates as the orifice type and in which the C-ring is deformed under a pressure not less than a predetermined pressure to relive an oil pressure from the opening of the relief hole.

Note that a cross-sectional view of the oil leakage groove 114e may optionally be set appropriately to provide an optional orifice effect, and the oil leakage groove 114e may also be formed to extend in a meandering manner to optionally set a flow path length.

Alternatively, the oil leakage groove 114e may also be provided to be relieved from the opening of the relief hole to the outside of the plunger on the leading end side and thereby set a flow path length short.

While the embodiments of the present invention have been described in detail heretofore, the present invention is not limited to the embodiments described above, and it is possible to make various design changes without departing from the present invention described in the claims.

What is claimed is:

1. A tensioner comprising:
   a plunger having a rearwardly open plunger inner space;
   a housing having a forwardly open plunger containing hole that contains the plunger;
   a main biasing means extendably and retractably contained in a pressure oil chamber formed between the plunger and the plunger containing hole to forwardly bias the plunger; and
   a relief mechanism that relieves oil in the pressure oil chamber to the outside of the plunger when an oil pressure in the pressure oil chamber increases,
   the relief mechanism including a relief hole extending through the plunger from the inside of the plunger inner space to an outer circumferential side thereof and a hole closing member pressed into an opening of the relief hole on the outer circumferential side.

2. The tensioner according to claim 1, wherein
   the plunger has a fitting recessed portion in an outer circumference thereof,
   the relief hole opens inside the fitting recessed portion, and
   the hole closing member is formed so as to be elastically fitted into the fitting recessed portion.

3. The tensioner according to claim 2, wherein
   the hole closing member is an annular C-ring having a slot in a portion thereof.

4. The tensioner according to claim 3, further comprising:
   a position fixing mechanism that restricts circumferential movement of the hole closing member inside the fitting recessed portion of the hole closing member.

5. The tensioner according to claim 4, wherein the position fixing mechanism includes a projecting portion provided on an inner circumferential side of the hole closing member.

6. The tensioner according to claim 5, wherein the position fixing mechanism includes a recessed portion provided at a position inside the fitting recessed portion which is different from that of the relief hole.

7. The tensioner according to claim 2, wherein the plunger has an oil leakage groove formed inside the fitting recessed portion to extend from the opening of the relief hole to a slot portion of a C-ring.

* * * * *